United States Patent [19]

Henry

[11] Patent Number: 4,817,889

[45] Date of Patent: Apr. 4, 1989

[54] FOOLPROOF SIMPLIFIED VACUUM SYSTEMS

[76] Inventor: Richard D. Henry, R.D. #1, Box 331-A, Clinton, Pa. 15026

[21] Appl. No.: 169,142

[22] Filed: Mar. 10, 1988

Related U.S. Application Data

[63] Continuation-in-part of Ser. No. 85,790, Aug. 17, 1987, abandoned.

[51] Int. Cl.$^4$ .............................................. B60T 13/00
[52] U.S. Cl. ..................................... 244/1 R; 244/79; 417/159
[58] Field of Search .................. 244/1 R, 79, 53 R, 58; 417/151, 198, 65, 197, 158, 159; 74/5.7; 73/178 R; 188/154; 60/280, 281

[56] References Cited

U.S. PATENT DOCUMENTS

| | | | |
|---|---|---|---|
| 1,407,491 | 2/1922 | Sperry | 74/5.7 |
| 1,494,569 | 5/1924 | Alley | 188/154 |
| 1,642,129 | 9/1927 | Plaut | 417/159 |
| 2,059,481 | 11/1936 | Oishei et al. | 417/159 |
| 2,181,250 | 11/1939 | Reichel | 74/5.7 |
| 2,272,986 | 2/1942 | Weinkauff | 74/5.7 |
| 2,715,709 | 8/1955 | Schoeppel | 74/5.7 |
| 2,934,903 | 5/1960 | Hupp et al. | 188/154 |
| 4,211,200 | 7/1980 | Rocchio et al. | 417/159 |

*Primary Examiner*—Sherman D. Basinger
*Assistant Examiner*—Stephen P. Avila

[57] ABSTRACT

Vacuum systems for use aboard aircraft and other vehicles, wherein, by simplified design, the systems of this new invention are virtually foolproof. This new invention utilizes the age old venturi due to its simplicity and lack of moving parts, but due to innovation, the limitations of the venturi have been overcome. This new invention installs the venturi within the exhaust tailpipe of engines and puts the extreme high velocity of exhaust gas movement to good use. These systems are compatible with just about any engine, and obviously venturi ice problems are eliminated. These systems may be used to provide redundant power for gyro systems and windshield wiper systems. By the addition of a suction relief valve and connective tubing the system will provide regulated suction pressure for the operation of a Gyro Horizon and or a Directional Gyro. By further addition of a restrictor needle valve and additional connective tubing, one can power either a Turn and Bank indicator or A Turn Co-ordinator. By the simple addition of a speed control needle valve, one may power a set of vacuum motor driven windshield wipers. The venturis and adjacent connective tubing will require the use of special alloys so as to survive high temperature encounter. Vacuum pressure will become available immediately following engine start up. These systems are suitable for use on airplanes, helicopters, blimps, dirigibles, boats, trucks, earth moving equipment, tractors, automobiles and the like but not restricted thereto. They also work well on Brake Booster Servo units, such used on power brake systems of automobiles. Some autopilots operate by means of vacuum power therefore compatible to these new systems.

3 Claims, 6 Drawing Sheets

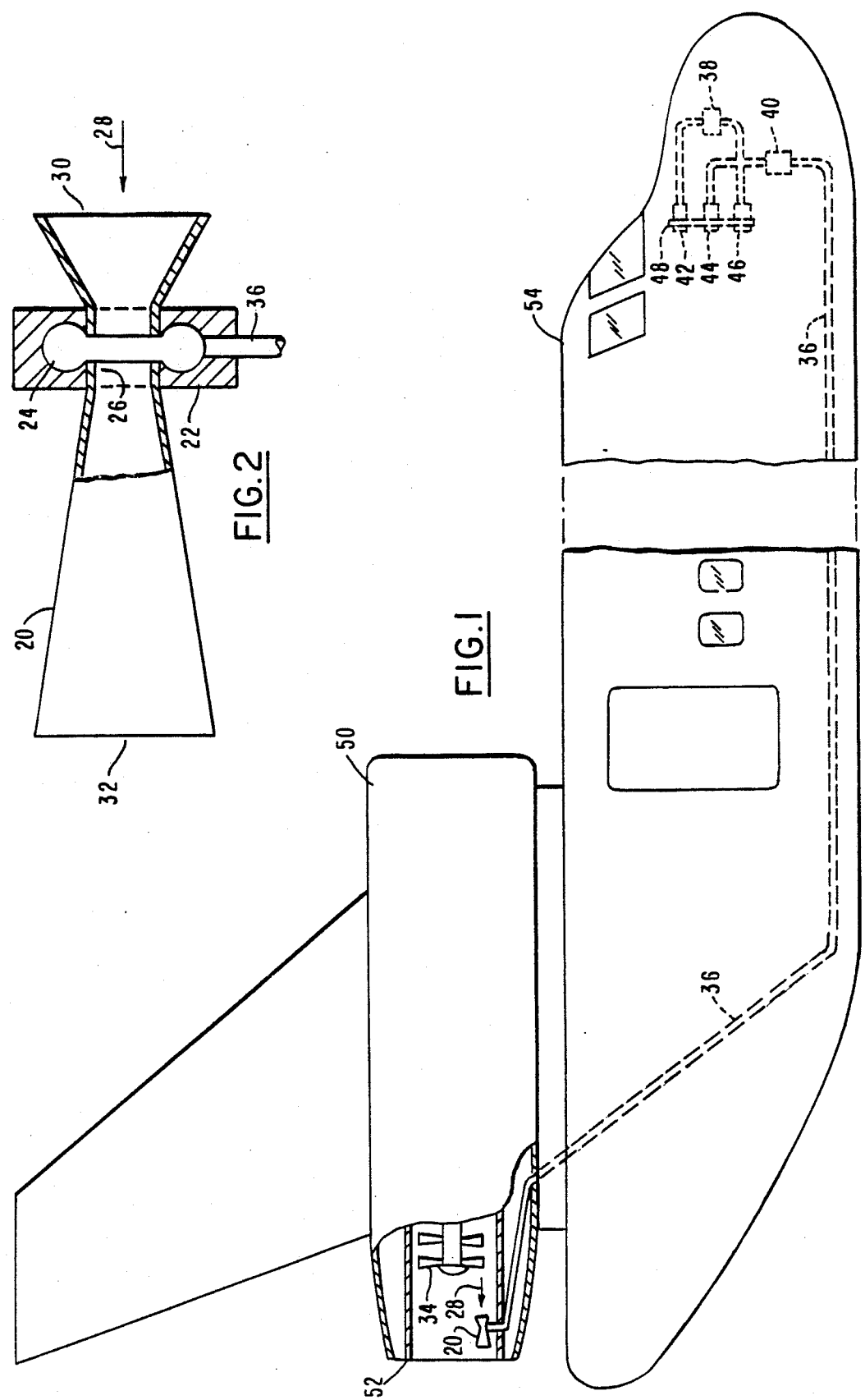

4,817,889

FOOLPROOF SIMPLIFIED VACUUM SYSTEMS

CROSS REFERENCES TO RELATED APPLICATIONS

This application is a continuation-in-part of application Ser. No. 07/085,790 filed Aug. 17, 1987, now abandoned.

BACKGROUND OF THE INVENTION

1. Field of the Invention

This invention relates to vacuum systems used on board air-craft, land-craft and sea-craft with improved means for providing the vacuum source. The vacuum will become available immediately following engine start up.

2. Description of the Prior Art

Vacuum source is normally derived by means such as vacuum pumps, wet or dry or venturis located within the slip stream.

SUMMARY OF THE INVENTION

Improved means to provide vacuum source requiring no moving parts wherein, the vacuum pressure will become available immediately following engine start. This new invention derives the vacuum by means of the insertion of a venturi shaped insert of snug fit within the inner wall of an exhaust tail pipe or by means of the venturi shape being formed into the wall of the tail pipe at the time of tail pipe manufacture, wherein high velocity exhaust gas movement thru the venturi will result in desired vacuum pressure.

OBJECTS OF THE INVENTION

Objects of this invention are trustworthiness, low weight, low cost, low maintenance and ease of modification.

BRIEF DESCRIPTION OF THE DRAWINGS

FIG. 1 shows a side view of an aircraft with its tail mounted turbo-jet engine in partial section, engine hot section being shown by said section.

FIG. 2 shows a venturi in partial section.

DESCRIPTION OF THE ILLUSTRATED EMBODIMENTS

Figure 4:
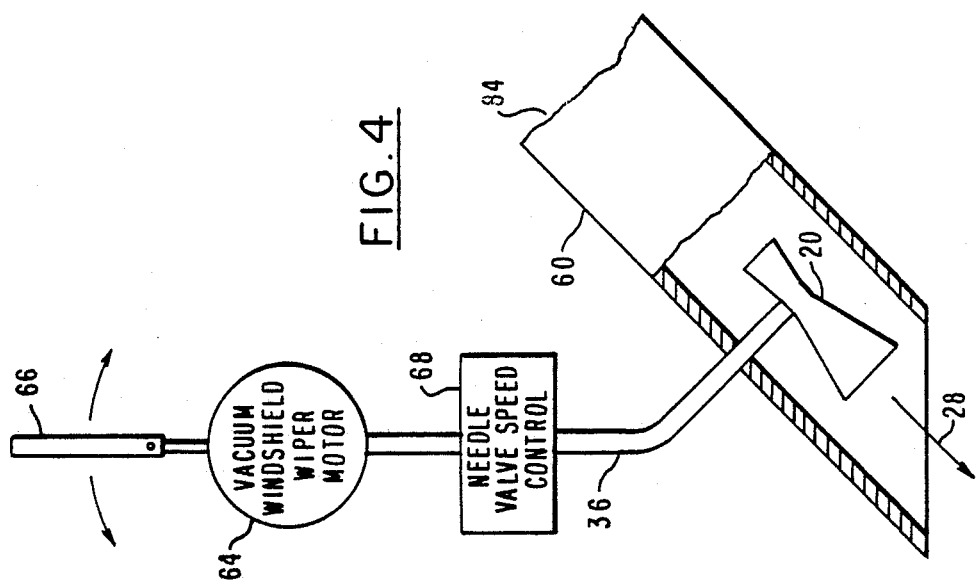
FIG. 4 shows an engine exhaust stack (tail pipe) in partial section, also portraying a venturi a manual speed control, a windshield wiper motor (vacuum driven) and connective tubing.
Figure 3:
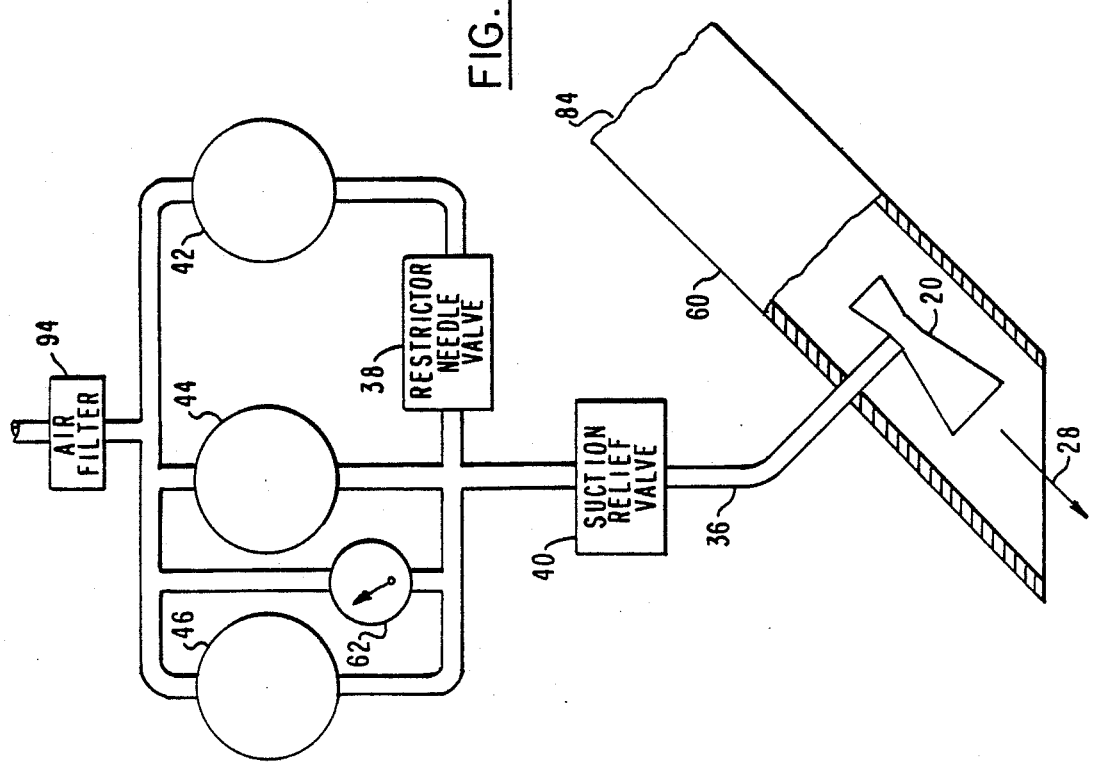
FIG. 3 shows an engine tailpipe in partial section, said section portraying a venturi, suction relief valve, restrictor needle valve, gyro horizon, directional gyro and turn and bank and connective tubing.
Figure 5:
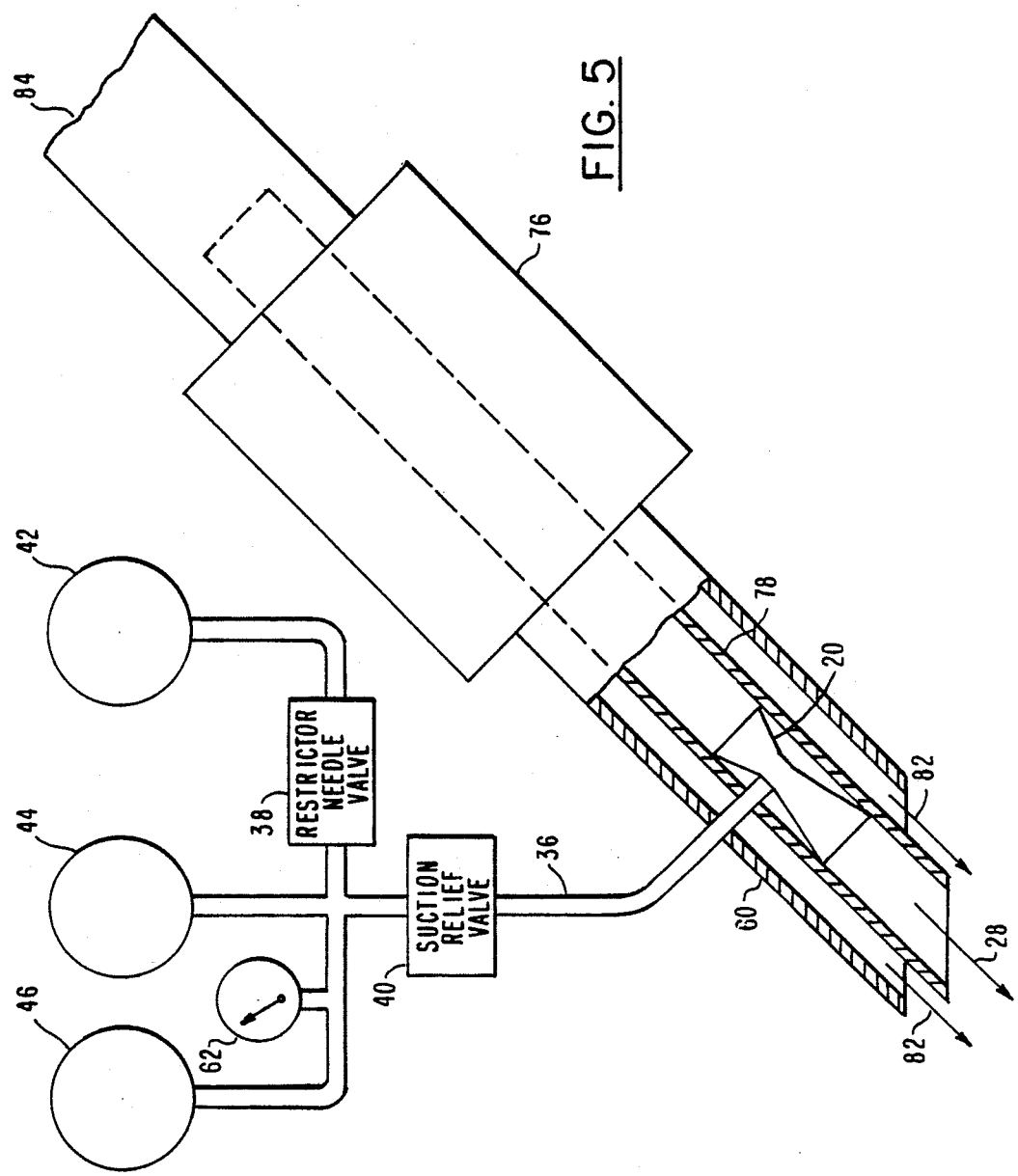
FIG. 5 shows an exhaust tailpipe, its muffler, an exhaust by-pass tube, a venturi, a suction relief valve, a restrictor needle valve, a gyro horizon, a directional gyro, a turn and bank indicator and connective tubing.
Figure 6:
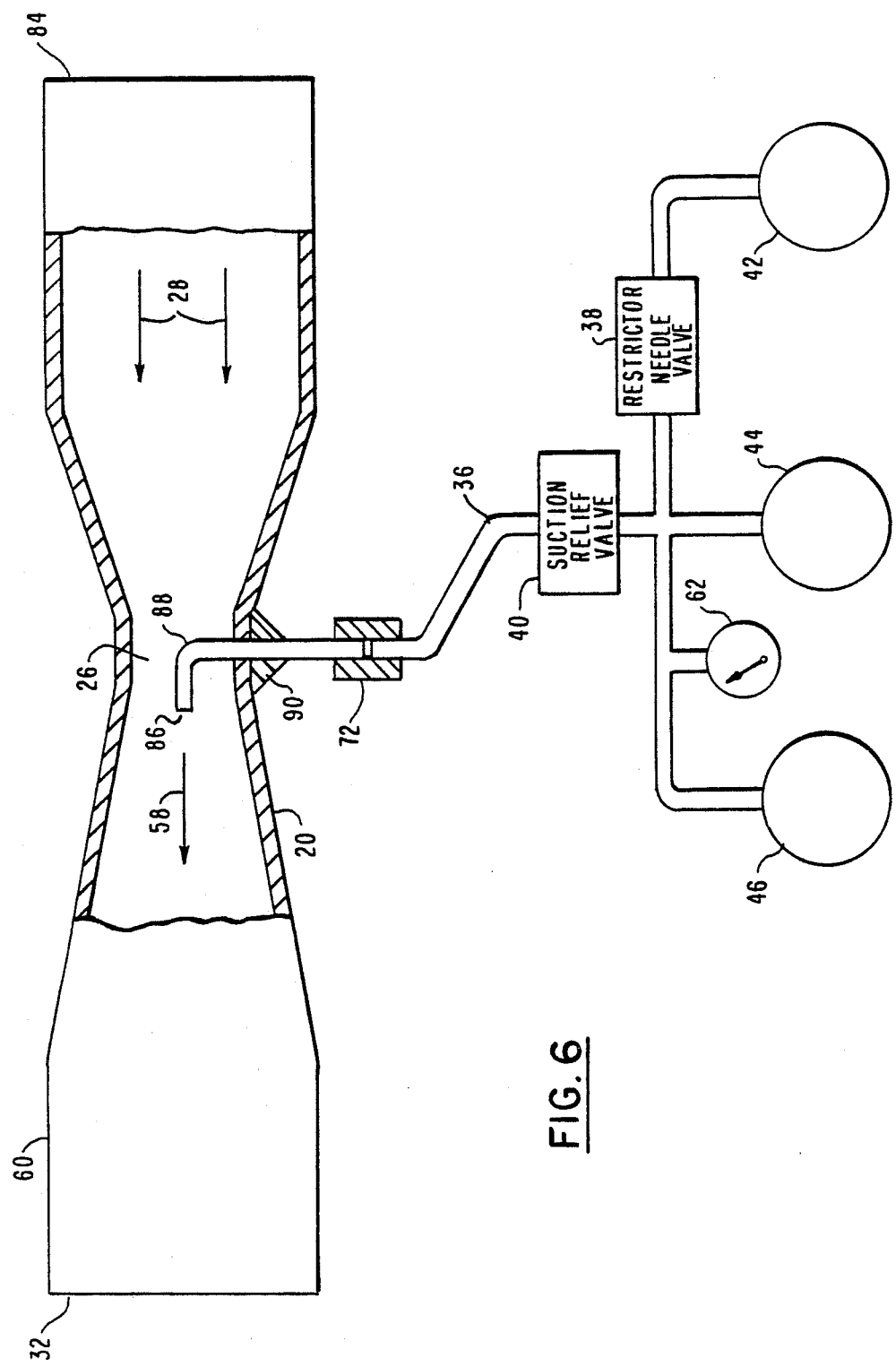
FIG. 6 shows an exhaust tailpipe, a venturi formed by the walls of said tailpipe in partial section, a bent tube ejector, a suction relief valve, a restrictor needle valve, a gyro horizon, a directional gyro, a turn and bank indicator and connective tubing.

Referring to FIG. 2, we see a venturi 20, venturi body 22, annular recessed ring 24, exhaust gas flow 28, venturi inlet mouth 30, venturi tail end 32, and connective tubing 36. In operation as exhaust gas flow 28 passes thru venturi 20 a low pressure will occur in the annular recessed ring 24, whereby, a suction will develop in connective tubing 36. By reference to FIG. 1, we see aircraft 54, turbo-jet engine 50, wherein, venturi 20 is shown within tail pipe liner 52. Hot exhaust gas flow 28 will pass thru venturi 20, thereby inducing a vacuum within connective tubing 36, wherein exhaust gas flow 28 is accelerated to a high vleocity by means of enormous thermal expansion due to burning fuel, said expansion will cause hot section turbine blades 34 to rotate in response thereto. Connective tubing 36 is routed along the belly of the fuselage, said tubing connecting to suction relief valve 40, said relief valve to supply regulated vacuum pressure to gyro horizon 44, directional gyro 46 and restrictor needle valve 38 will further reduce the pressure for the turn and bank indicator 42, said pressures available immediately following engine start. Referring to FIG. 3, we see venturi 20 located within exhaust tail pipe 60, said pipe assumed to be connected to a reciprocating engine type. High velocity exhaust gas flow 28 being liberated by said engine, will pass thru end 84 and further thru venturi 20, thereby inducing a suction pressure within connective tubing 36, said tubing being connected to suction relief valve 40, said valve will distribute regulated vacuum pressure to gyro horizon 44, directional gyro 46 and pressure will be further reduced by restrictor needle valve 38 for the operation of turn and bank indicator 42. Referring to FIG. 4, we see exhaust gas flow 28 passing thru venturi 20, said flow thereby inducing a suction pressure within connective tubing 36, wherein needle valve speed control 68 connected thereto will be manually controlled by the pilot for the operation of vacuum windshield wiper motor 64, said motor controlling wiper blade 66 sweep rate. End 84 is assumed to be connected to an engine. Referring to FIG. 5, we see exhaust by-pass tube 78, exhaust tail pipe 60, venturi 20, muffled exhaust gas flow (low velocity) 82, exhaust gas flow (high velocity) 28, muffler 76, venturi 20, connective tubing 36, suction relief valve 40, restrictor needle valve 38 and end 84 to engine, whereby, exhaust gas flow 28 thru venturi 20 will develop suction pressure within tubing 36 connected to suction relief valve 40, said valve supplying regulated pressure to gyro horizon 44, directional gyro 46 and restrictor needle valve 38 further reducing the pressure for the turn and bank indicator 42. Referring to FIG. 6, we see venturi 20, exhaust tail pipe 60, air from the gyros being ejected shown by arrow 58, bend in the ejector tube 88, weld fillet 90, exhaust gas flow 28, connective tubing 36, suction relief valve 40, restrictor needle valve 38, gyro horizon 44, directional gyro 46 and turn and bank 42, and end 84 will connect to an engine exhaust manifold. In operation, exhaust gas flow 28 will pass thru venturi 20 said flow will speed up as it passes thru the constricted section of the venturi, wherein as the speed increases the pressure will decrease setting up a low pressure area at the constructed section of the venturi (Bernoulli principal of fluid dynamics). The low pressure will induce a very high suction in connective tubing 36, said suction will be regulated by suction relief valve 40 so as to provide regulated suction pressure being connectable to the gyro horizon 44 and directional gyro 46 and restrictor needle valve 38 will further reduce pressure for the operation of the turn and bank 42. Suction relief valve 40 will be adjusted to approximately 4 inches of mercury and the restrictor needle valve 38 will be adjusted to about 2 inches of mercury. In operation, exhaust gas flow will pass the discharge end of bent tube 88 and will augment the ejected flow 58 due to the molecules intermixing and also due to the viscosity of said molecules, said augmentation will provide additional boost to the suction pressure. This type of venturi with discharge end of the tube facing downwind relative to the direction of exhaust gas flow, will, due to said orientation remain free of exhaust gas deposits. To manufacture this type of venturi, a forming mandrel will be inserted at each end of the tube, the tube wall will be heated cherry red before said insertion, then a forming roll will be used to roll in the desired shape. Bent tube will be inserted following mandrel withdrawal, and then said bent tube will be fillet welded to hold said tube in place. It will be understood that most modern airliners no longer use a basic gyro and they merely use a Standby Third Attitude Gyro so it will further be understood that in these cases, the turn and bank indicator will be removed likewise the restrictor needle valve as it also will be removed, and the directional gyro may also be removed if desired. NOTE: Some modern airliners keep a gyro horizon and a directional gyro as an emergency standby system. After said removal, open end of connective tubes may be capped off as required, said caps being normal tubing pipe caps. Again referring to FIG. 6, juncture fitting will be used to join Bent tube 88 with connective tube 36. Juncture fitting 72 will also be used for removal if necessary.

Figure 7:
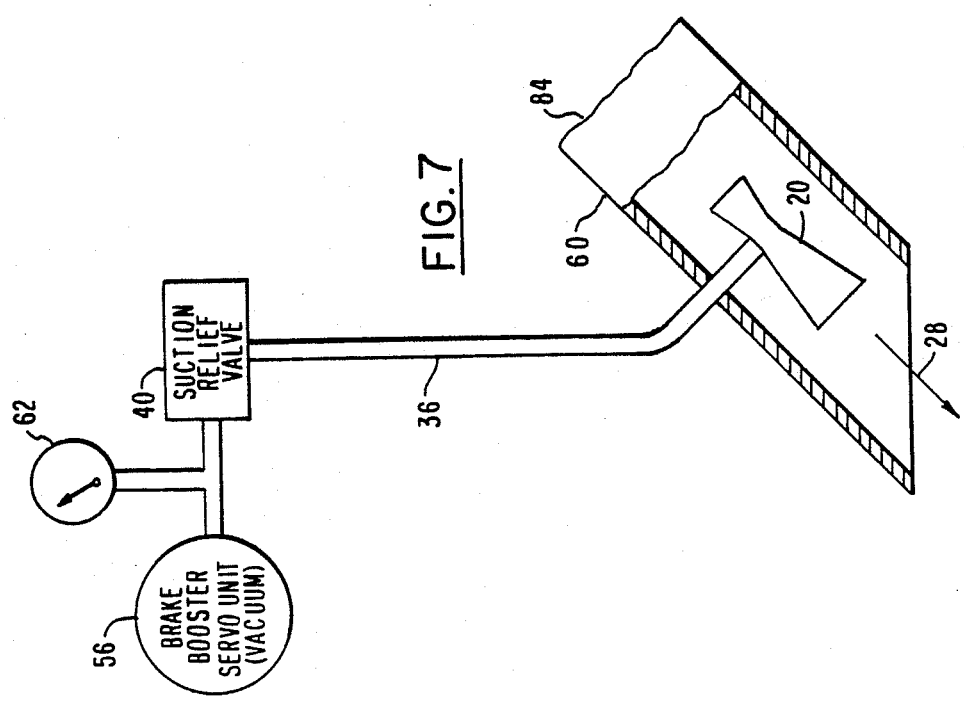
FIG. 7 shows a power brake system (vacuum powered), its Brake Booster Servo Unit, its suction relief valve, connective tubing, and it shows an exhaust tail pipe in partial section, clearly showing the venturi internal positioning.

Referring to FIG. 7, we see a Vacuum brake Booster Servo Unit 56, a suction relief valve 40, connective tubing 36, venturi 20, exhaust tail pipe 60, and end 84, wherein, said end 84 will connect to an engine and the (high velocity) exhaust gas flow 28 therefrom, will pass thru venturi 20, whereby, a suction will develop within connectable tubing 36, wherein, suction relief valve 40 thereto attached will supply regulated vacuum pressure for the proper operation of Brake Booster Servo Unit 56.

Vacuum pressure gauge 62 is common to FIG. 3, FIG. 5, FIG. 6, and FIG. 7, therefore referred to collectively.

Figure 8:
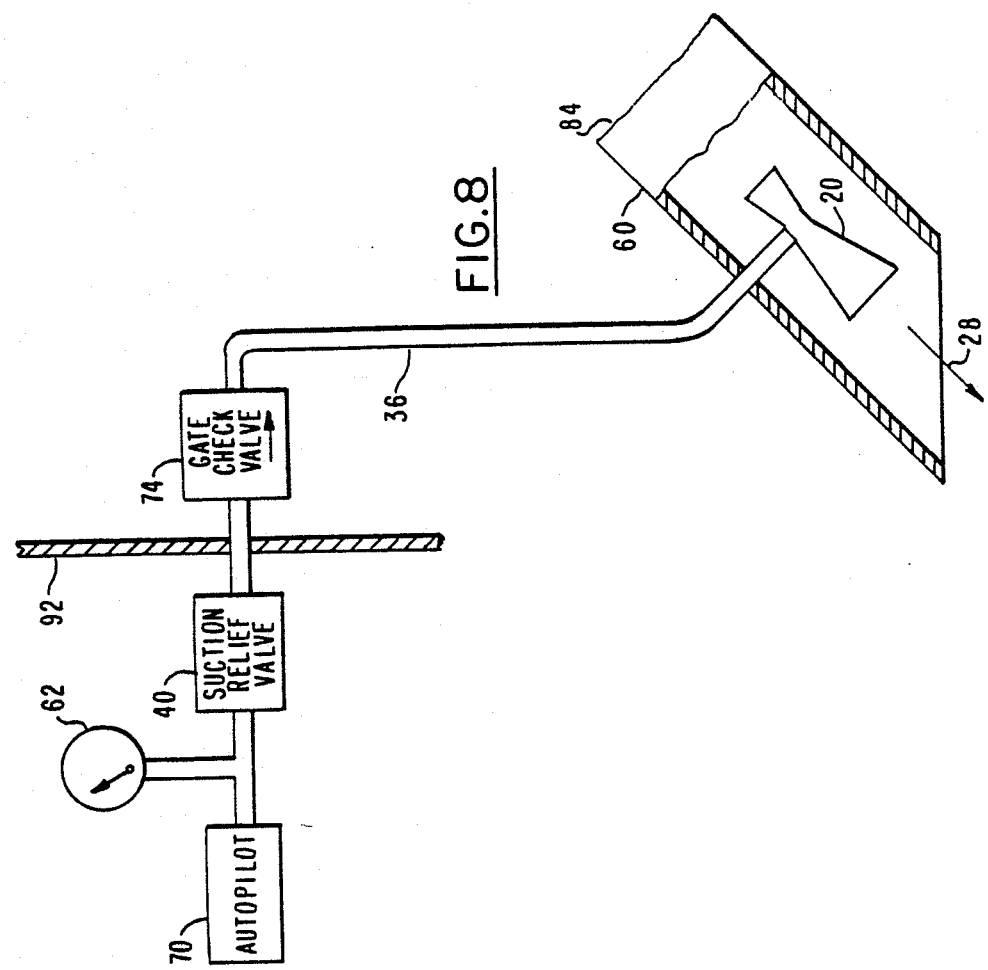
FIG. 8 shows a venturi located within the wall of an exhaust tail pipe, it likewise shows a suction relief valve, an autopilot, a vacuum pressure gauge and connective tubing. Exhaust tail pipe is shown in partial section.

Referring to FIG. 8, we see an exhaust tail pipe in partial section, we also see a venturi 20 located within exhaust tail pipe 60. Exhaust gas flow 28 will be very high velocity thereby inducing a suction within connective tubing 36, due to and as a result of said exhaust gas flow passing thru venturi 20. We also see suction relief valve 40, vacuum pressure gauge 62 and autopilot 70, wherein, suction relief valve 40 will provide regulated vacuum pressure for the operation of autopilot 70. End 84 will connect to the exhaust manifold of an engine.

For improved detail, venturis are portrayed in considerable oversize. Due to the extreme high velocity of exhaust gas flow the venturi may be of a very small size and still deliver sufficient volumetric output at the required suction pressures.

It will be further understood that if the venturi is made large enough, it may provide enough volume and pressure for numerous combinations of the predescribed systems even if the systems are being used simultaneously.

It will be understood that a (one way) gate check valve may be serially connected to any or all of the predescribed systems, so as to preclude the possibility of reverse flow thru the connective tubing, wherein, reverse flow, though doubtful, could possibly happen due to a catastrophic failure of the venturi, therefore, a gate check valve positioned between the venturi and the firewall, serially connected, would insure that exhaust gasses could never back flow into the cabin or cockpit areas. Referring to FIG. 8, we see gate check valve 74 and firewall 92 so situated. The check valve will only allow air to flow from the gyros toward the venturi and said gate check valve will be spring loaded so as to prevent exhaust gas flow from the venturi toward the gyros. Referring to FIG. 3, we see a common air filter 94 in use, this filter means being used in lieu of individual gyro filters.

Figure 9:
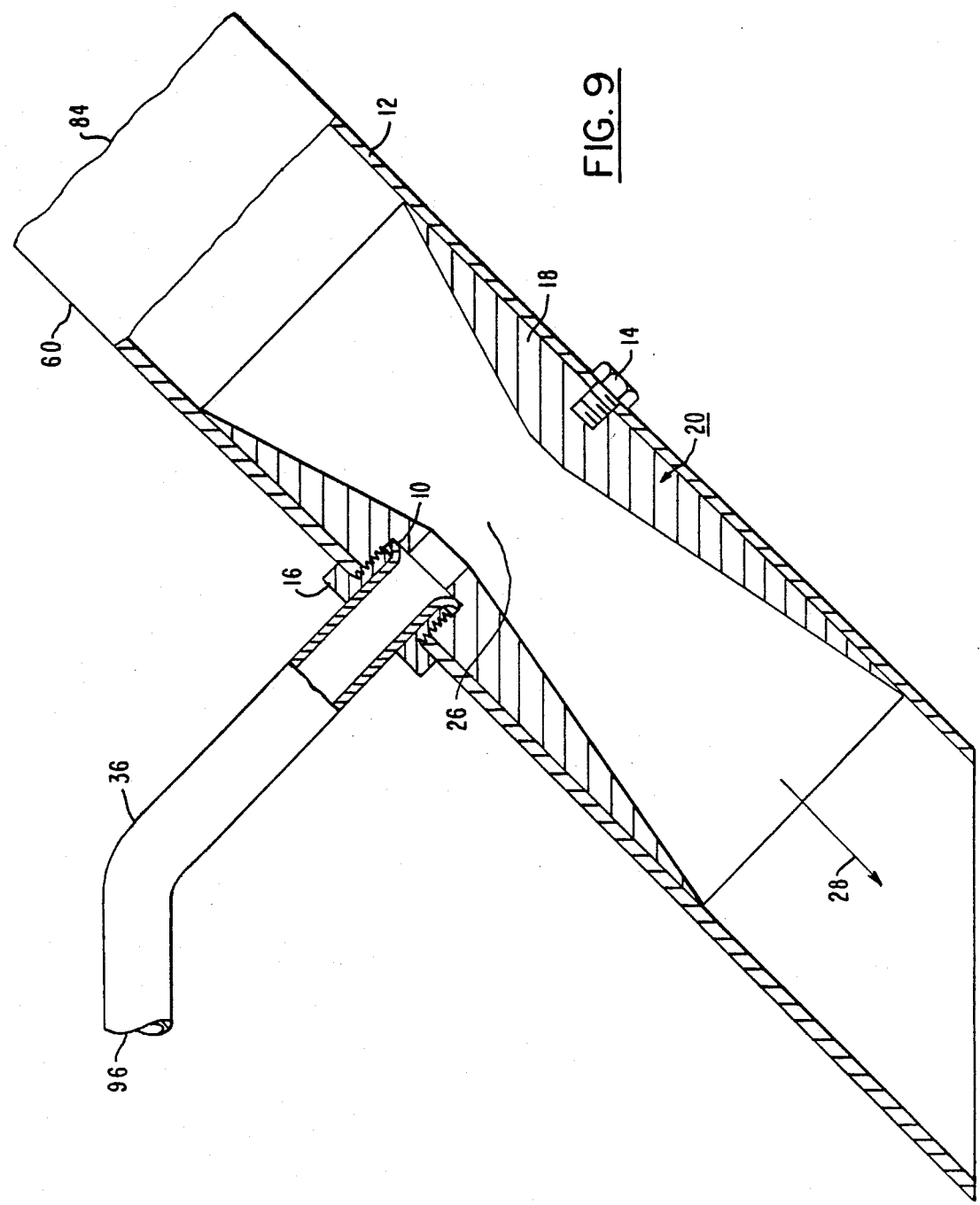
FIG. 9 shows a venturi insert located within the wall of an exhaust tail pipe and connective tubing thereto attached, tail pipe and connective tubing in partial section, venturi insert shown in full section.

Referring to FIG. 9, we see venturi 20, retaining bolt 14, insert body 18, wall 12, end connectable to engine 84, exhaust tail pipe 60, flare nut 16, flare 10, constricted throat 26, exhaust gas flow 28, connective tubing 36 and end 96. FIG. 9, is shown in section and partial section and portrays a venturi insert within the inner wall of an exhaust tail pipe as a source for the vacuum. Insert body 18 is fabricated from bar stock using a lathe or by casting in a foundary, the outer circumference of insert body 18 will be a snug fit to the inner circumference of wall 12 of tail pipe 60. THE inner circumference of insert body 18 will be contoured to the shape of a venturi. Flare nut 16 will retain connective tubing 36 to insert body 18. Flare nut 16 will also secure insert body 18 to tail pipe 60 thus preventing insert body 18 from being blown out of tail pipe 60 thus preventing insert body 18 from being blown out of tail pipe 60, additional security may be provided by retaining bolt 14 if desired. High velocity exhaust gas flow 28 thru venturi 20 will produce a vacuum within connective tubing 36 end 96 of which will connect to the vacuum systems of the vehicle, such vehicle may be an air-craft, a land-craft or a sea-craft.

OPERATION

The venturi is common to all views FIG. 1 thru FIG. 7 therefore the operating principals will be put forth collectively. Bernoullis principal states that that in a fluid, as the speed increases the pressure decreases. It has been found that as air passes thru the constricted section of a venturi the speed of the air increases with a resultant drop in pressure at the constricted section, therefore this low pressure area can be tapped off and put to useful work. The advantage of the venturi is obvious; no moving parts. By reference to FIG. 2 we see venturi 20 and exhaust gas flow 28 which when passing thru venturi 20 it will set up a low pressure area at the constricted throat 26 thereby inducing a low pressure area likewise in annular recessed ring 24, thus inducing a suction in connective tubing 36. Exhaust gas flow 28 will discharge out venturi tail end 32 after passing thru venturi 20. Referring to FIG. 1, we see aircraft 54 and following start up of Turbo-Jet engine 50, hot section turbine blades 34 will discharge high velocity exhaust gas flow 28, wherein, said flow will obviously pass thru venturi 20, thereby inducing suction pressure in connective tubing 36, said tubing connecting to suction relief valve 40, said relief valve will distribute regulated vacuum pressure of about 4 inches of mercury to the gyro horizon 44, directional gyro 46 and to restrictor needle valve 38, said needle valve further reducing the suction pressure to about 2 inches of mercury pressure, said reduced pressure for the operation of the turn and bank 42 by means of connective tubing. Referring to FIG. 3, we see exhaust tail pipe 60 common to most gasoline and diesel engines of the reciprocating type. Numeral 84 will depict the end that is connectable to the engine from which to receive exhaust gas flow 28, said flow as it passes thru venturi 20 will induce a suction pressure within connective tubing 36, said tubing connecting to suction relief valve 40, said valve will distribute regulated suction pressure of about 4 inches of mercury to gyro horizon 44, directional gyro 46 and likewise to restrictor needle valve 38, said valve being adjusted to further reduce the suction pressure to about 2 inches of mercury, for the operation of the turn and bank 42, said gyros to receive said suction pressures by means of additional connective tubing. Referring to FIG. 4 we see exhaust tail pipe 60, wherein, exhaust gas flow 28 obviously originated in an engine, then passed thru connectable end 84, on thru venturi 20, thereby inducing a suction pressure within connective tubing 36, said tube connecting to needle valve speed control 68, said control operated by the pilot so as to precisely control the speed of vacuum windshield wiper motor 64, thereby controlling the rate of wipe of wiper blade 66, said system serially connected by means of connective tubing. Referring to FIG. 5, we see muffler 76 and exhaust tail pipe 60, we also see exhaust by-pass tube 78 so situated within and on direct centerline relative to said tail pipe and likewise on centerline relative to said muffler, wherein, the centerline location will be guaranteed and held secure by means of muffler baffels, whereby, in the manufacture thereof, centerline holes will be cut of proper size to allow a tight fit with the exterior wall ofs aid by-pass tube 78, then the by-pass tube will be secured by welding to said muffler baffels, said baffels not shown as they are state of the art. Exhaust gasses that enter connectable end 84 will divide, some of the gasses will pass thru the muffler and some of the gasses will by-pass said muffler and pass thru by-pass tube 78. At the discharge end of tail pipe 60, we see muffled low velocity exhaust gasses 82 and we also see high velocity exhaust gasses 28 which will encounter only a very slight impediment due to a slight increase of boundary layer resistance with the wall of said venturi 20, wherein, by the reaction of the venturi to the exhaust gas flow 28, a suction will develop within connective tube 36, said tube connecting to suction relief valve 40, said valve to distribute regulated suction pressure of about 4 inches of mercury to gyro horizon 44, directional gyro 46 and restrictor needle valve, said restrictor needle valve 38 to further reduce the suction pressure to about 2 inches of mercury for the operation of the turn and bank 42, said gyros feed by additional connective tubing. Referring to FIG. 6, we see a novel and somewhat unique vacuum source in that the venturi is shaped by the wall of the exhaust tail pipe 60, said shape achieved by means of heating pipe tubing to a very bright cherry red and then rolling the exterior wall with rolls of the desired shape, all the while shape held proper by 2 mandrels inserted internally into said tube 60 from each end. After forming, mandrels will be removed. An air ejector tube will be bent to a 90 degree angle and inserted as shown in FIG. 6, tube bend 88 will direct the discharge end of said ejector tube so that its opening is facing downstream, said opening located at the constricted throat 26 of said venturi 20, wherein ejected air vacuum flow 58 will eject from ejector opening 86. Rate of ejected airflow will be proportional to the pressure drop (vacuum) of encounter at said constricted throat 26. Ejected air will also receive augmentation due to the inter-mix of ejected air molecules and the high velocity molecules of the exhaust gas flow 28, likewise due to the viscosity of said air molecules additional augmentation does occur. Ejected air vacuum flow 58 will continue until it ejects out of the discharge end of exhaust tail pipe 60. Due to this action, a suction pressure will develop within tube 36, said connective tube 36 will connect to suction relief valve 40, said valve to supply regulated suction pressure for the operation of the gyro horizon, directional gyro and it also supplies pressure of about 4 inches of mercury to the restrictor needle valve 38, said needle valve will be adjusted to further drop the pressure to about 2 inches of mercury for the operation of the turn and bank indicator 42. Gyro horizon 44 and directional gyro 46 will continue to operate at a pressure of 4 inches of mercury, said gyros being connected by means of additional connective tubing. It will be understood that these vacuum systems may be used on: airplanes, helicopters, blimps, dirigibles, boats, trucks, earth moving equipment, tractors, automobiles and motorcycles, but, not restricted thereto. They also work well on Brake Booster Servo Units for the power brakes on most automobiles. Juncture fitting 72 will join bent tube 88 and connective tube 36. This new invention is adaptable to: any engine type available, such as; turbo-jet type, or a turbo-prop type, or, a ram-jet type, or, a pulse jet type, or an otto 4 cycle gasoline type, or a sterling cycle type, or a rotary type, or a 2 cycle gasoline powered type, or a 2 cycle diesel type, or, a 4 cycle diesel type, or the like, but, not restricted thereto. The venturis of this new invention will be constructed of alloys adaptable to high temperature encounter, such as; Stainless Steel, titanium or the like, but not necessarily restricted thereto.

Numerous changes could be made in the predescribed embodiments and many apparently widely different embodiments of this invention could be made without departing from the scope thereof, it is intended that all matter contained in the above description or shown in the accompanying drawings shall be interpreted as being illustrated only and not limiting.

It will be understood that these systems may be used to power only a single gyro horizon such as a gimbal lock preventing type (tumble resistant), wherein, the restrictor needle valve will no longer be needed, so one may discard it and now the vacuum supply is down to only one moving part, that being the suction relief valve. This system obviously will be far more reliable than the electrical third attitude gyros in use today on turbo powered aircraft. A master air filter system may be used in lieu of individual gyro filters, such a master system shown in FIG. 3, showing air filter 94 connectable to the gyros and pressure gauge.

By reference to FIG. 7, we see exhaust tail pipe 60, wherein, an engine will connect to end 84 thru which exhaust gasses will pass down to and thru and around venturi 20 and being more specific we will consider only the exhaust gas flow (high velocity) 28 that passes thru the venturi 20. This will induce a very high suction within connective tubing 36, said tube connected to suction relief valve 40, said valve will deliver regulated suction pressure to a brake booster servo unit 56, said unit operating on a vacuum principal, said booster servo unit will provide power brakes for the vehicle upon which it is installed. Suction relief valve will be adjustable to the desired pressure required for proper operation of said servo unit.

Vacuum pressure gauge 62 is common to FIG. 3, FIG. 5, FIG. 6, and FIG. 7, therefore referred to collectively.

Referring to FIG. 8, we see a venturi 20 within exhaust tail pipe 60, said tail pipe being in partial section and we will assume its end 84 is connected to the exhaust manifold of an engine. A suction will develop within connective tubing 36, said tubing connecting to suction relief valve 40, wherein suction relief valve 40 will provide regulated vacuum pressure for the operation of autopilot 70. Suction within connective tubing 36 is induced as a reaction to high velocity exhaust gas flow 28 passing thru venturi 20. Vacuum autopilots are common to many aircraft, normally providing very smooth operation. Vacuum pressure gage 62 will be used for the adjustment of suction relief valve 40 and also will provide suction read-out for the pilots.

Venturis are portrayed in considerable oversize so as to provide improved detail. Due to the efficiency of these new systems, the venturis may be very small in size and still provide necessary volumetric output and pressure.

Any or all of the predescribed systems may be combined into one system providing that the venturi size is sufficient to provide for simultaneous use of said systems at the required volumetric output, at the required pressure for proper operation.

Referring to FIG. 8, we see Gate check valve 74 which may be installed so as to guarantee against a possible reverse flow of gas movement. The gate check valve will be spring loaded to close should for any reason exhaust gasses attempt to back flow toward the cockpit, said check valve being located between the venturi and the firewall 92. Gate check valves may be installed on any or all of the predescribed systems as a safety percaution.

Referring to FIG. 9, we see venturi 20, retaining bolt 14, insert body 18, wall 12, end connectable to engine 84, exhaust tail pipe 60, flare nut 16, flare 10, constricted throat 26, exhaust gas flow 28, connective tubing 36 and end 96. FIG. 9, is shown in section and partial section and portrays a venturi insert within the inner wall of an exhaust tail pipe as a source for the vacuum. Insert body 18 is fabricated from bar stock using a lathe or by casting in a foundary, the outer circumference of insert body 18 will be a snug fit to the inner circumference of wall 12 of tail pipe 60. THE inner circumference of insert body 18 will be contoured to the shape of a venturi. Flare nut 16 will retain connective tubing 36 to insert body 18. Flare nut 16 will also secure insert body 18 to tail pipe 60 thus preventing insert body 18 from being blown out of tail pipe 60, additional security may be provided by retaining bolt 14 if desired. High velocity exhaust gas flow 28 thru venturi 20 will produce a vacuum within connective tubing 36 end 96 of which will connect to the vacuum systems of the vehicle, such vehicle may be an air-craft, a land-craft or a sea-craft.

What I claim:

1. A vacuum system of an aircraft providing vacuum pressure immediately following engine start up comprising;
   (a) a longitudinally extending exhaust tail pipe;
   (b) an exhaust by-pass tube coaxially contained within the tail pipe:
   (c) a venturi shaped insert having a throat and being held in a snug fit inside the by-pass tube such that all high velocity exhaust gas passing through the by-pass tube passes through the venturi; and
   (d) a suction pressure tube extending from the venturi throat and passing at right angles through the tail pipe and by-pass tube to a suction relief valve and to a turn and bank indicator, a gyro horizon, and a directional gyro, with the turn and bank indicator also having a restrictor needle valve.

2. A vacuum system of an aircraft providing vacuum pressure immediately following engine start up comprising:
   (a) a longitudinally extending exhaust tail pipe;
   (b) a venturi shaped insert having a throat and being held in a snug fit inside the exhaust tail pipe such that all high velocity exhaust gas passing through the exhaust tail pipe passes through the venturi; and
   (c) a suction pressure tube extending from the venturi throat and passing at right angles through the tail pipe and to a suction relief valve and to a turn and bank indicator, a gyro horizon, and a directional gyro, with the turn and bank indicator also having a restrictor needle valve.

3. A vacuum system of an aircraft providing vacuum pressure immediately following engine start up comprising:
   (a) a longitudinally extending exhaust tail pipe liner of a turbine engine with turbine blades, the liner having an open rear end;
   (b) a venturi having a throat and being held tightly to the inside wall of the exhaust tail pipe liner at the rear open end such that some of the high velocity exhaust gas passing through the exhaust tail pipe liner will pass through the venturi; and
   (c) a suction pressure tube extending from the venturi throat and passing at right angles through the tail liner, then passing forward within the turbine engine, then passing downward to a suction relief valve and to a turn and bank indicator, a gyro horizon, and a directional gyro, with the turn and bank indicator also having a restrictor needle valve.

* * * * *